March 27, 1951 E. E. ROWE 2,546,786
GRUBBING MACHINE
Filed Dec. 17, 1946 3 Sheets-Sheet 1
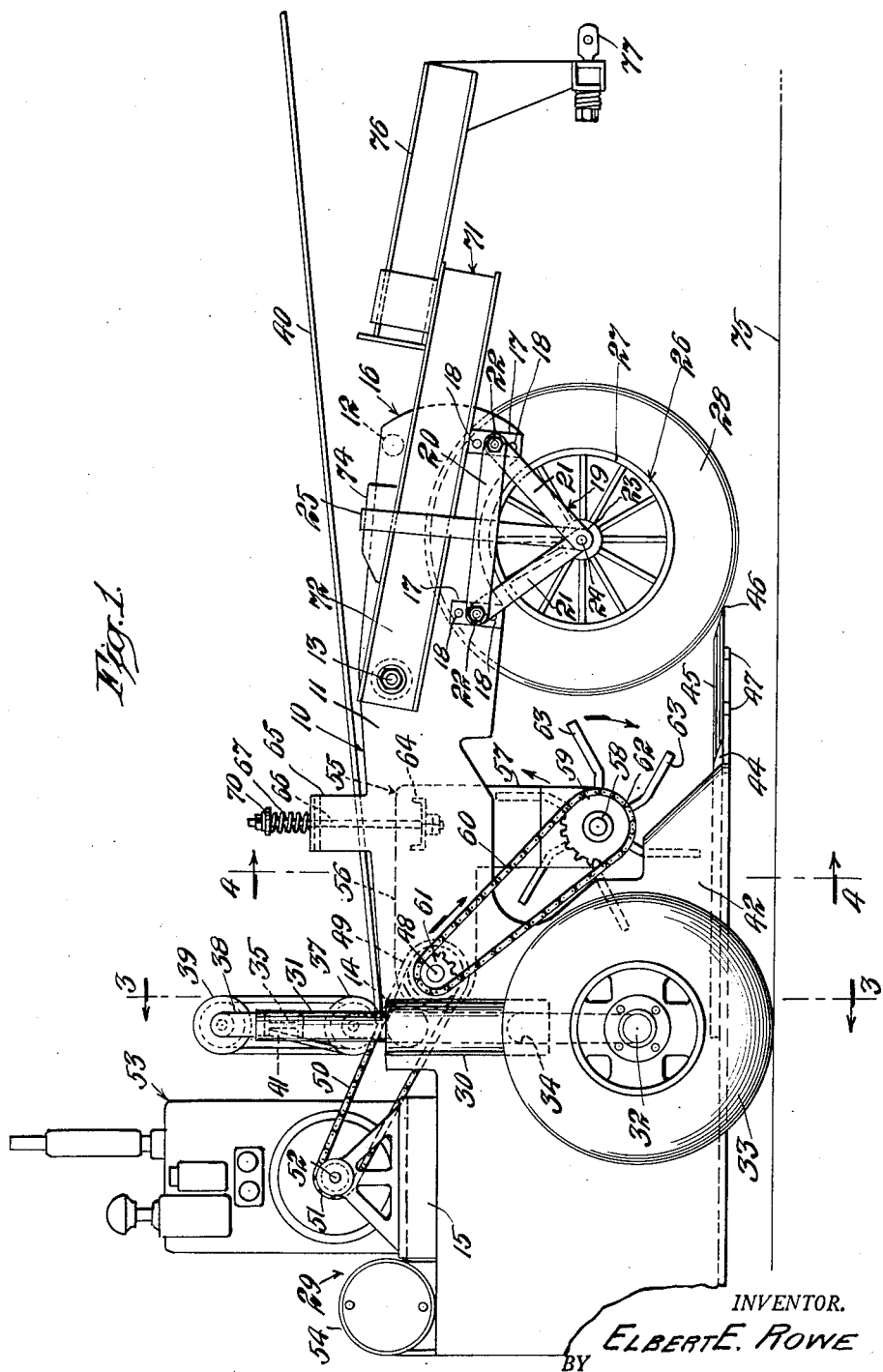
INVENTOR.
ELBERT E. ROWE
BY Watson, Bristol, Johnson & Leavenworth
ATTORNEYS March 27, 1951 E. E. ROWE 2,546,786
GRUBBING MACHINE
Filed Dec. 17, 1946 3 Sheets-Sheet 2
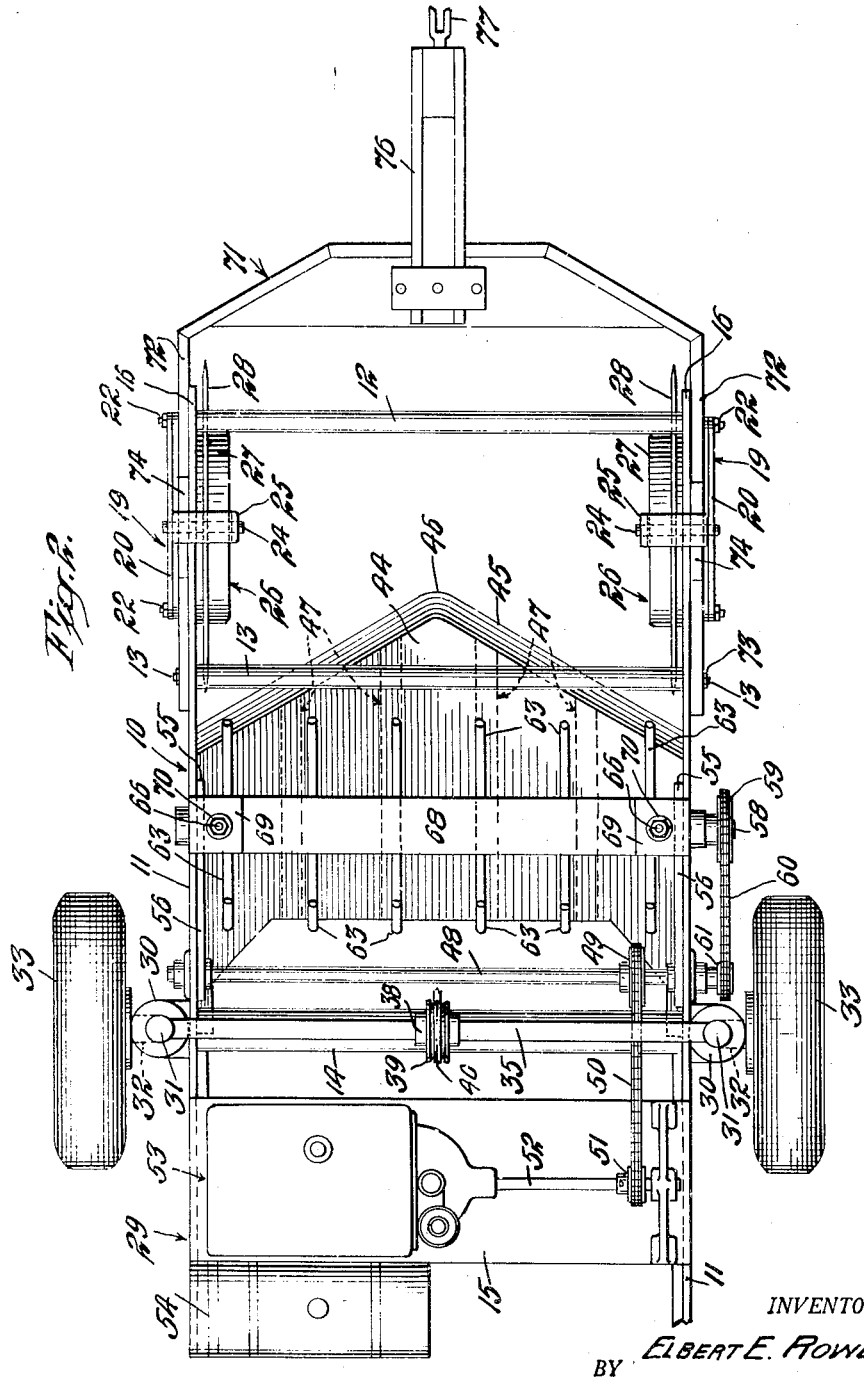
INVENTOR.
ELBERT E. ROWE
BY Watson, Bristol, Johnson & Leavenworth
ATTORNEYS March 27, 1951  E. E. ROWE  2,546,786
GRUBBING MACHINE
Filed Dec. 17, 1946  3 Sheets-Sheet 3
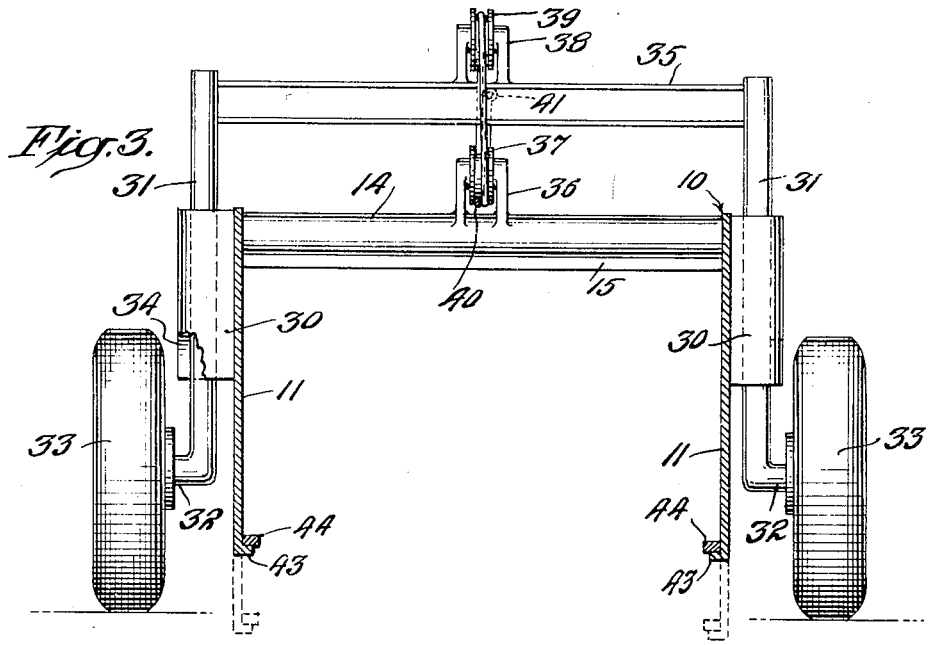
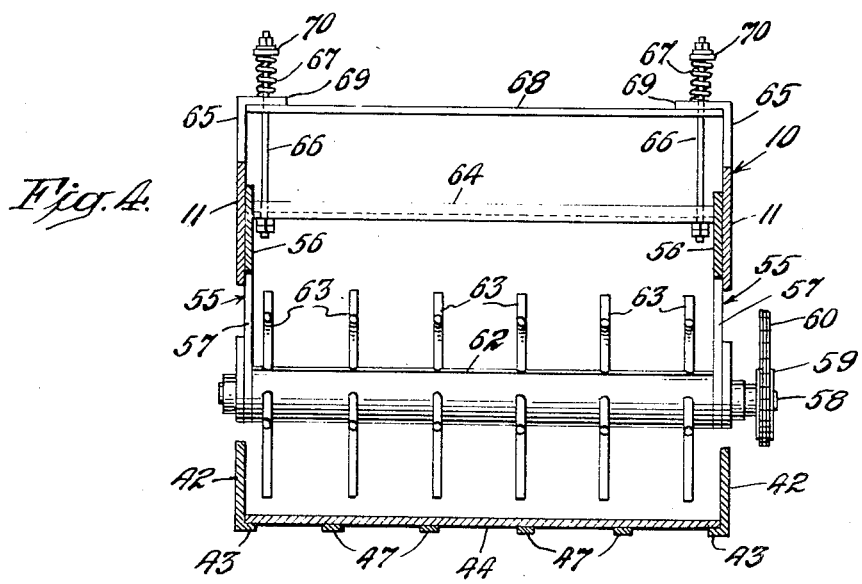
INVENTOR.
ELBERT E. ROWE
BY
Watson, Bristol, Johnson & Leavenworth
ATTORNEYS Patented Mar. 27, 1951

2,546,786

UNITED STATES PATENT OFFICE 2,546,786

GRUBBING MACHINE

Elbert E. Rowe, Clearwater, Fla., assignor to W. H. Armston Company, Inc., Dunedin, Fla., a corporation of Florida Application December 17, 1946, Serial No. 716,746

1 Claim. (Cl. 97—226.1)

The present invention relates to a grubbing machine and has for a general object the provision of such a machine which is readily constructed and easily operated by dragging it across a sod surface whereby it will efficiently define in the sod a swath cut along its two sides and across the bottom thereof at a desired depth so as to sever roots in the swath from adjacent soil, and which will then effectively kick down into the sod swath to tear therefrom and free underbrush root masses of various types, such as roots of palmetto, devil's shoestring, oak runners, etc., efficiently to toss them to the surface of the soil while leaving the latter substantially in position and while permitting the kicking means to crawl up over relatively heavy obstructions, such as stumps, rocks, logs, etc., so that operation of the machine may be efficiently continued without tendency to damage or break it and parts thereof.

A more specific object of the present invention is to provide such a machine wherein kicker arms are so rotated at such speed as to keep the cutting edge of a sub-soil blade efficiently clear of root masses while it is defining a substantially horizontal bottom cut of a swath, the kicker arms effectively tearing those roots substantially free from the sod and tossing them to the rear upon the soil surface while efficiently threshing them to shake substantially all soil free therefrom, the roots and debris thus being left on the top of the soil for ready removal as the soil is efficiently aerated and replaced substantially in its original position.

Another object of the present invention is to provide such a grubbing machine which in operation requires a minimum of power to force the sub-soil blade through the sod at a desired depth, kicker means to tear the roots from a sod swath defined by side and bottom cuts made by the machine being operated by an independent power unit on the machine which permits drive of the kicker means at a desired accelerated speed while minimizing the drawbar horsepower necessary to move the machine over sod.

A further object of the present invention is to provide in such a machine certain mechanism whereby complete control thereof as to adjustment of the depth at which the sub-soil blade makes a bottom cut for a swath may be had from a remote point, such as a tractor pulling the machine and which also permits adjustment to free the sub-soil blade and kickers from the ground surface to permit easy transportation from one location to another.

A still further object of the present invention is to provide a structural embodiment of the device which is readily constructed and allows efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claim.

For a fuller understanding of the nature and objects of the invention, reference should be had to the following detailed description taken in connection with the accompanying drawings, in which:

Fig. 1 is a side elevational view, with parts broken away, of an embodiment of the grubbing machine of the present invention, showing the same conditioned for transportation from one location to another;

Fig. 2 is a top plan view, with parts broken away, of the grubbing machine shown in Fig. 1;

Fig. 3 is a sectional elevation, with parts broken away and omitted, taken on line 3—3 of Fig. 1, and Fig. 4 is a sectional elevation, with parts broken away and omitted, taken substantially on line 4—4 of Fig. 1.

Grubbing machines are in great demand for removal of underbrush and the roots thereof from soil to permit the use of the latter as farm and pasture land, etc. In recent years there has been a great increase in activity on the part of stock raisers to clear land in the State of Florida so that it may be employed as pasture land. The sod or ground in that State presents a particular and very trying problem with respect to attempts to clear it since the fertile soil thereof is so heavily matted with roots of underbrush, such as devil's shoestring, oak runners and, more particularly, palmetto. Further, it has been found that palmetto roots may be ground up into coarse particles which may be efficiently employed as raw material in various types of manufacturing, such as the construction of wall board. These two demands have posed the problem of rapid and economical clearing of such land whereby the roots may be efficiently removed from the soil to a desired depth of, say, six or seven inches, the soil thoroughly threshed therefrom, those roots distributed on the top surface of the soil there to die and for subsequent collection, and the rich soil permitted to settle substantially back in position so as to serve, when cleared, as excellent farming or pasture land. The present invention has been found efficiently to accomplish these desired ends while eliminating tedious and slow labor attendant upon other means of removing such roots for use of the rich soil and the destructive effects attendant upon the harvesting of the roots by means of bulldozers or scrapers which damage the fertility of the land.

The present invention will be understood by referring to the accompanying drawings in which like numerals identify like parts throughout. As shown in Figs. 1 and 2, the machine includes a vehicle frame 10 comprising a pair of spaced-apart side members 11, 11, of steel plate or the like, which may be shaped as shown in Fig. 1 to incorporate in the frame construction certain structural features and to accommodate other elements of the machine. The frame side plates, 11, 11 may be tied together in spaced-apart relation at various points by tie bolts and rods and other cross structure. For example, tie rods 12 and 13 may tie the front ends of the side plates 11, 11 together and the rear ends thereof may be tied together by a bar 14, shown more particularly in Fig. 3, and a cross platform 15, and by any other suitable cross structure which may be desired, fixed in position by any suitable means, such as by bolting and welding, etc. For example, tie rod 12 and tie bar 14 are welded to the side plates 11, 11, and tie rod 13 is bolted thereto.

The front end 16 of the vehicle frame 10 is provided with suitable front wheel supports, each of which in the embodiment shown in the drawings may comprise a pair of plates 17, 17 fixed to the outside of side plate 11, and provided with a plurality of holes 18—18. A triangular bracket 19 comprises a cross strap 20 and oblique straps 21, 21, bolted to plates 17, 17 by bolts 22, 22 selectively positioned in holes 18—18. The plurality of holes 18—18 in each plate 17 permits selective elevational mounting. The oblique straps 21, 21 meet at 23 rotatably to support a stub wheel axle 24 which carried a U-shaped strap 25 looped up over the front end of the side plate 11. This structure is duplicated on both sides of the front end of the vehicle frame so that there are two stub wheel axles 24, 24, as shown in Fig. 2.

Each wheel axle 24 supports a front wheel 26 which has a laterally extending rim 27 on which medially is fixed an outwardly extending radially disposed coulter flange or blade 28. Accordingly, when the front end of the machine is lowered to ride over the surface of the sod the coulter blades 28, 28 will cut down into the sod to define margins of a swath of sod therebetween and the front end of the machine will be supported by the wheel flanges 27, 27 riding on the sod surface.

On each side plate 11 of the vehicle frame near the rear end 29 thereof is fixed, such as by welding, a substantially vertically arranged tubular guide 30 slidably receiving a substantially vertical post 31 having at its lower end a stub axle 32 on which is rotatably supported a rear wheel 33. Each cylinder guide 30 is preferably cut away at 34 to permit greater elevational movement of the stub axle 32. The top ends of the two posts 31, 31 are tied together by a crossbeam 35, preferably welded thereto.

The cross bar 14 preferably carries a bracket 36 on which is rotatably mounted a double sheave or pulley 37 and the cross beam 35 preferably carries a bracket 38 on which is rotatably mounted a sheave or pulley 39. A cable 40 is lapped back and forth about the sheaves or pulleys 37 and 39 with one end 41 tied or fixed to cross beam 35. Accordingly, when pull is imposed on cable 40, such as by means of a winch on a prime mover or tractor adapted to pull the machine, the sheaves 37 and 39 are brought closer together so as to cause the posts 31, 31 to slide downwardly through guides 30, 30 and thereby raise the vehicle frame, such as to the position shown in Fig. 1. Slacking off of cable 40 of course permits the vehicle frame to be lowered relative to the rear wheels 33, 33.

At the rear end 29 of the vehicle frame, in the vicinity of the rear wheels 33, 33, the side plates 11, 11 have downwardly extending portions 42, 42. The bottom edges thereof, as shown in Fig. 4, may be turned inwardly to provide flanges 43, 43 to support a laterally extending substantially horizontally arranged elongated sub-soil blade 44. The sub-soil blade 44, as shown in Fig. 2, has a sharpened front cutting edge 45 the side portions of which are obliquely arranged to meet at a substantially medially located point 46. The sub-soil blade 44 also has fixed to the bottom face thereof a plurality of longitudinally extending runners 47—47 to serve both as wear plates and as means to aerate the soil as the sub-soil blade is drawn forward therethrough, while reducing frictional drag. It will be seen from Fig. 4 that the supporting flanges 43, 43 cooperate with the runners 47—47 in these functions.

The frame side plates 11, 11 carry a rotatable cross shaft 48 on which is fixed a sprocket 49 about which is lapped an endless chain 50, also lapped about a sprocket 51 fixed on a power unit shaft 52. The power unit shaft 52 constitutes the drive shaft of any suitable power unit, such as a gasoline engine 53 supported on platform 15. A drum 54 may also be carried by the frame to serve as a gasoline tank.

The cross shaft 48 pivotally supports adjacent the inner face of each frame side plate 11 a bracket plate 55. Each bracket plate 55 has a horizontal arm 56 which is pivotally mounted on shaft 48 and a downwardly extending arm 57 arranged substantially at right angles thereto. Together the bracket plates 55, 55 constitute a carriage pivotally supported on cross shaft 48 for up and down swinging movement. The downwardly extending arms 57, 57 of the carriage rotatably support a laterally extending shaft 58 which carries on one end a sprocket 59 fixed thereto. An endless chain 60 is lapped about sprocket 59 and also about a sprocket 61 fixed on an end of cross shaft 48 which projects through one of the frame side plates 11. Thus power unit or engine 53 will drive through its shaft 52, sprockets 51 and 49, and endless chain 50 the cross shaft 48. Cross shaft 48 in turn drives through sprockets 61 and 59 and endless chain 60 the carriage shaft 58.

The carriage shaft 58 is provided with an agitator drum or roller 62 fixed thereto and, if desired, the roller 62 may be made integral with the shaft 58 with stub ends thereof extending to provide for rotatable support of the roller and for mounting of the sprocket 59. The roller 62 carries fixed thereto a plurality of kicker arms 63—63 which extend generally radially from the cylindrical surface of the roller. The kicker arms 63—63 are preferably bent backwards slightly, as shown in Fig. 1, since they are to be rotated in the direction shown by the arrow so as to pull roots away from the cutting edge 45 of the sub-soil blade 44 to tear them free from the soil and toss them to the rear. With the arms so shaped there will be less tendency for roots into which the kicker arms 63—63 are hooked in rotation to retain them thereon and wind them up about the agitator roller 62. The roots, as they are in turn freed from the soil and pulled toward the rear, will readily slide off the bent kicker arms 63—63 to be tossed and dropped onto the surface of the soil. It will be seen from Figs. 2 and 4 that the kicker arms 63—63 are fixed to the cylindrical surface of the roller 62 at various points distributed substantially over the entire lateral extent of the roller and, of course, it will be understood that instead of arranging them in laterally spaced-apart circular rows they may be staggered in the rows, or otherwise arranged.

The weight of the agitator roller 62, its supporting structure, the kicker arm 63—63, the driving sprocket 59 and driving chain 60, in addition to the weight of the carriage 55, 55, weight-bias the latter downwardly. Some of this weight-biasing is preferably reduced by spring means. This bias reducing means, as shown in Figs. 1 and 4, may comprise a cross beam 64 tied between the carriage plates 55, 55, a pair of brackets 65, 65 mounted on the frame side plates 11, 11, sliding bolts 66, 66 and helical springs 67, 67. The brackets 65, 65 may be strengthened by a cross strap 68. Each bolt 66 is slidably received through a hole in carriage cross beam 64 and another hole in a laterally extending portion 69 of bracket 65. Above the laterally extending bracket portion 69 a helical spring 67 is arranged about the upwardly projecting end of bolt 66 and a plate 70 on the top end of the bolt bears down upon the top end of the spring. Thus the carriage 55, 55, with the structure supported thereon, is floatingly supported on springs 67, 67 while being weight-biased downwardly.

Since it is preferred to motivate the grubbing machine of the present invention by pulling it there is preferably provided at the front end a draw yoke 71 having a pair of side arms 72, 72 each of which is pivotally secured to a frame side plate 11 by any suitable means, such as a threaded end of tie rod 13 and nut 73 thereon. Each yoke arm 72 preferably extends through the U-shaped strap 25 between its outer leg and frame side plate 11 and, in order to raise the front end 16 of the machine up so that its coulters 28, 28 will be free from the ground surface, suitable wedging blocks 74, 74 may be provided temporarily to hold the machine and its parts in their relative transportation positions, as shown in Fig. 1, with the rear end 29 raised above the rear wheels 33, 33. This transportation position will be appreciated when it is understood that the line 75 in Fig. 1 diagrammatically represents sod or ground surface. The draw yoke 71 has fixed thereto a tongue 76 which carries a drawbar 77 for connecting the machine to a tractor for pulling it forward.

In operation, the grubbing machine of the present invention, after being transported to a site in the condition shown in Fig. 1, will be conditioned for grubbing action by removing the wedges 74, 74 permitting the front wheels 26, 26 and the front end 16 of the vehicle frame to be lowered. The cable 46 will be slacked off from the winch on the tractor so that the rear end 29 of the machine will be lowered. Then, as the machine is pulled forward, the coulters 28, 28 will sink into the ground or sod until the laterally extending front wheel rims 27, 27 rest upon the sod surface. The sub-soil blade 44 will bite into the sod and soon come to a position several inches below the sod surface. Preferably in clearing land in Florida, or for that matter other localities, the parts of the machine will be so adjusted as to cause the sub-soil blade 44 to be operating at a depth of about six or seven inches.

As the machine is pulled forward by the tractor the coulters 28, 28 form laterally spaced-apart vertical cuts down into the sod to define therebetween a swath and the sub-soil blade 44 forms a laterally extending bottom cut from coulter-defined vertical cut to coulter-defined vertical cut thereby severing all roots which extend from the swath into adjacent sod. The engine 53 will rapidly rotate the kicker arms 63, 63 downwardly in front and toward the rear on the side adjacent the sub-soil blade 44 to engage into root masses and hook against separate roots to pull them toward the rear and withdraw them from the soil so as to toss them to the rear upon the surface of the soil. These kicker arms 63, 63 also thresh the soil free from the roots which are then left on the surface of the soil, later to be harvested, if desired, or permitted to remain there until they die and then collected and burned. The soil is thus substantially freed of all roots without minimizing its fertility since it is permitted to drop back substantially in position in the swath as the machine passes onward. An advantage in using a separate power source, or engine 53, on the machine while the latter is being pulled forward by another power unit, such as a tractor, resides in the fact that this effects an economy in the operative horsepower necessary to pull the machine, and further permits a desired rapid rotation of the kicker arms 63, 63. As a result the kicker arms 63, 63 will travel along the arc of a circle in any time interval a greater distance than the forward travel of the machine so that when they engage root masses they will withdraw them from the soil and toss them to the rear.

The floating mount of the rotary kicker arms 63, 63 is not only important from the standpoint of adapting it to the contours of the surface of the sod over which the machine is pulled, but further in order to permit the agitator to climb up over any heavy obstructions, such as large stumps, stones, logs and the like, without damage to the machine and then to allow it to drop back down after passage over such heavy obstructions into root-withdrawing position on top of the surface of the sod.

This grubbing machine has proven to be highly effective in Florida where large areas of sod are substantially completely covered or matted with underbrush, particularly palmetto. This grubbing machine has been found effectively to clear such land, freeing large areas daily of roots so that the land may be employed for farming or pasture land and so withdrawing the roots from the soil and disposing them on the surface thereof so as to permit their ready harvesting. The soil's fertility is retained and the roots are threshed substantially free of soil to reduce to a minimum cleaning operations attendant upon preparation of the roots as raw material for use in manufacturing various products.

It will thus be seen that the objects set forth above and those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

A grubbing machine comprising, in combination, a wheeled vehicle frame adapted to be transported forward at a predetermined speed, laterally spaced sod-cutting means on the machine to cut margins of a swath of sod defined therebetween as the machine is moved forward, rear wheel means, adjustable means supporting the rear end of said frame on said rear wheel means to permit relative up and down movement, a laterally extending sub-soil blade mounted on said frame behind said sod-cutting means and having a sharp front edge of sufficient width to form a substantially horizontal cut at a desired depth across the swath, a floating carriage pivotally mounted on said frame for up and down swinging movement about a horizontal axis, a kicker roller rotatably supported by said floating carriage with its axis substantially horizontal and extending laterally substantially the width of and to the rear of the cutting front edge of said blade, a plurality of kicker arms fixed to said roller at various points distributed over substantially the entire extent of the circumferential surface thereof and extending in general radial directions therefrom, and power means to rotate said kicker roller with its arms moved in a forward walking direction and the remote outer ends thereof moving back away from the cutting edge of said blade on the lower side adjacent the latter, said power means including means to rotate said kicker arms at a certain predetermined speed relative to predetermined speed of forward motion of said machine whereby the ends of said arms will be moved along the arc of a circle circumscribed by their rotation a distance appreciably greater than the distance the machine will move forward in any interval of time so that said kicker arms as they are walked forward will kick down into the sod swath after it is cut at the sides by said laterally spaced sod-cutting means and along the bottom by said blade and tear therefrom any engaged roots to toss them to the rear upon the surface of the soil of the swath, the floating mount of said kicker roller permitting said kicker arms to crawl up over relatively heavy obstructions in forward movement of the machine.

ELBERT E. ROWE.

REFERENCES CITED

The following references are of record in the file of this patent:

UNITED STATES PATENTS

| Number | Name | Date |
|---|---|---|
| 336,475 | Crossley | Feb. 16, 1886 |
| 616,991 | Tanner | Jan. 3, 1899 |
| 620,421 | Cox | Feb. 28, 1899 |
| 1,704,349 | Spencer | Mar. 5, 1929 |
| 1,813,651 | Young | July 7, 1931 |
| 1,905,385 | Jass | Apr. 25, 1933 |
| 2,044,205 | Bruner | June 16, 1936 |
| 2,051,977 | Winston et al. | Aug. 25, 1936 |
| 2,154,970 | Briggs | Apr. 18, 1939 |
| 2,379,280 | Couch | June 26, 1945 |